United States Patent [19]

Kume

[11] Patent Number: 4,533,966
[45] Date of Patent: Aug. 6, 1985

[54] TAPE PLAYER FOR VEHICLES

[75] Inventor: Masato Kume, Tokyo, Japan

[73] Assignee: Clarion Co., Ltd., Tokyo, Japan

[21] Appl. No.: 419,437

[22] Filed: Sep. 17, 1982

[30] Foreign Application Priority Data

Sep. 21, 1981 [JP] Japan ............................ 56-140290[U]

[51] Int. Cl.³ .......................... G11B 15/32; G11B 5/40
[52] U.S. Cl. ....................................... 360/96.5; 360/93; 360/137
[58] Field of Search ........................ 360/96.5, 96.6, 93, 360/97, 137, 94, 95, 105; 242/199, 198, 200

[56] References Cited

U.S. PATENT DOCUMENTS

| 3,843,847 | 10/1974 | Sato | 360/96.5 |
| 4,150,410 | 4/1979 | Tsumura | 360/137 |
| 4,208,681 | 6/1980 | Hatchett | 360/97 |
| 4,327,385 | 4/1982 | Fujii | 242/198 |
| 4,424,540 | 1/1984 | Naoi | 360/96.6 |

Primary Examiner—Robert M. Kilgore
Attorney, Agent, or Firm—Russell E. Hattis; Stephen R. Arnold

[57] ABSTRACT

A tape player is provided which has a tape player set and an operation board mounted on the front face of the tape player set. The tape player is particularly characterized in that a tape pack insertion aperture which is formed in a part of said operation board is closed or opened by a cover which is rotatable about a rod fixed on the front face of said operation board.

9 Claims, 13 Drawing Figures

TAPE PLAYER FOR VEHICLES

BACKGROUND OF THE INVENTION

This invention relates to a tape player for vehicles with watertight structure particularly suitable for use in open-type two-wheeled vehicles.

Tape players like cassette stereo devices to be mounted on open two-wheeled vehicles have to be protected against water and dust. However, since conventional tape players for cars have been designed for use in four-wheeled vehicles which are closed from the outer air, they do not have sufficient resistance against water and dust. Therefore, it is apparent that the life of such a tape player will extremely be short if it is used in two-wheeled vehicles as it is.

OBJECT OF THE INVENTION

It is therefore an object of the present invention to provide a tape player for vehicles with a watertight structure particularly suitable for use in open-type vehicles.

SUMMARY OF THE INVENTION

In accordance with the present invention, there is provided a tape player for vehicles which comprises:
a tape player set for vehicles;
an operation board (panel) mounted on front face of said tape player set, said operation board having formed a tape pack insertion aperture through which a tape pack is inserted in said tape player set; and
a cover plate pivotally fixed on said operation board for closing or opening said aperture.

BRIEF DESCRIPTION OF THE DRAWINGS

FIGS. 1 to 9 show embodiments according to the present invention in which:
FIGS. 1, 2a, 2b, 3 to 5, 7a, 7b and 8a are perspective views; and
FIGS. 6a, 6b, 8b and 9 are sectional views.

DETAILED DESCRIPTION OF THE PREFERRED EMBODIMENTS

Figure 1:
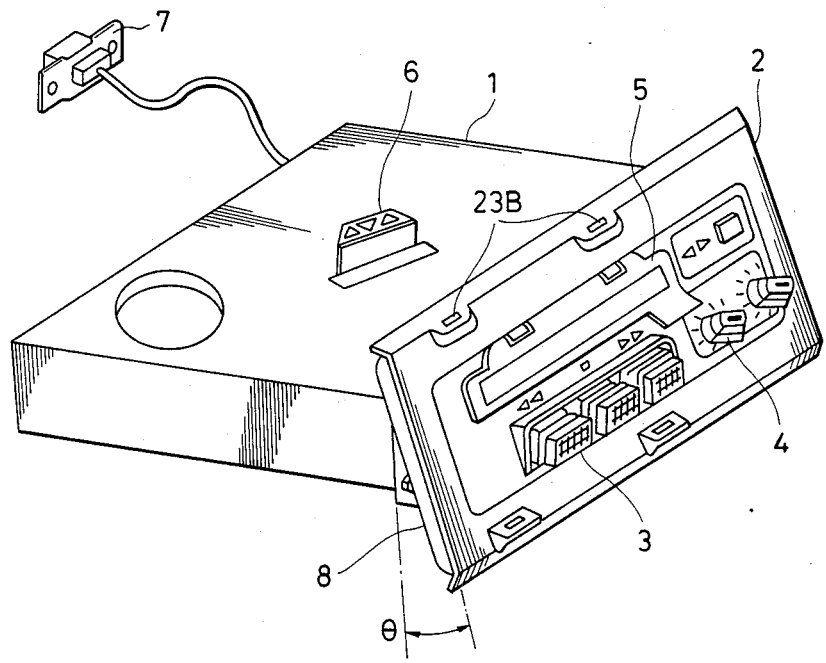

The present invention will now be described in detail by way of the preferred embodiments referring to the drawings.

FIG. 1 is a perspective view illustrating water-tight structure according to the present invention in which the reference numeral 1 refers to a tape player set 1 including a cassette stereo set carried by a chassis and the numeral 2 denotes an operation board (panel) which is called an "escutcheon". The operation board 2 is mounted on the front face of the tape player set 1 with θ degrees inclination. The numeral 3 refers to operation buttons provided on the operation board 2, 4 to thumb knobs, 5 to a cover plate, 6 to cushion members provided on the top and bottom surfaces of the tape player set 1, and 7 to a connector.

Figure 3:
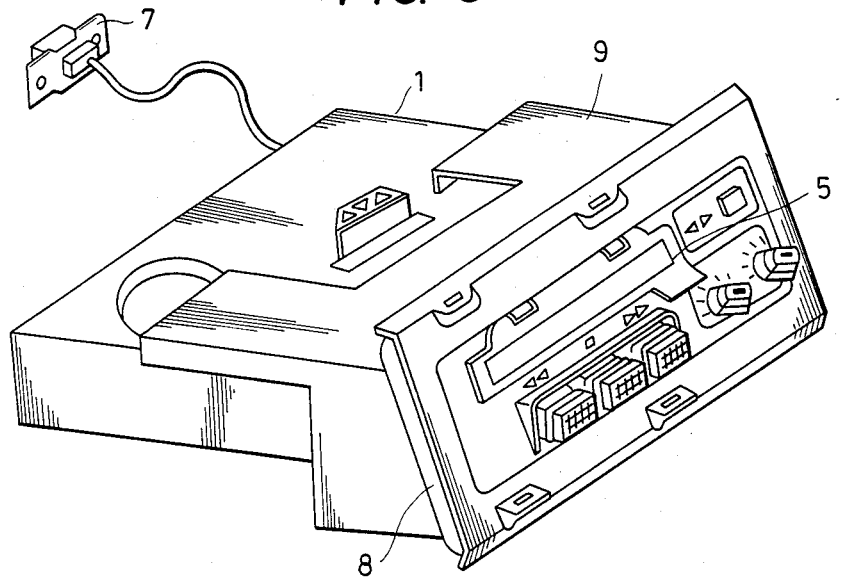
Figure 4:
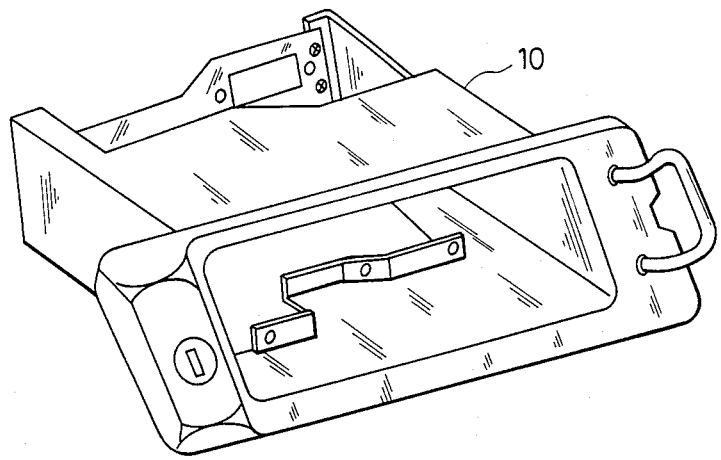
Figure 5:
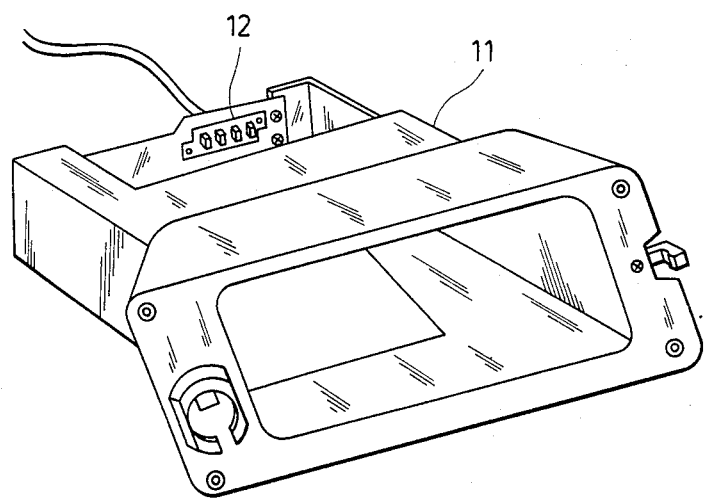

The tape player set 1 is incorporated in an inner case 9 through a second cushion member 8 adhered to the back surface of the operation board 2 as shown in FIG. 3. The tape player set 1 carrying the inner case 9 is thereafter put in an outer case 10 as shown in FIG. 4. Said incorporated body of the tape player set 1, inner case 9 and outer case 10 is inserted in a fixture case 11 of FIG. 5 which is mounted on a two-wheeled vehicle, for example. By finally connecting the connector 7 to a connector 12 of the fixture case 11, assembly of the tape player is completed.

Figure 2A:
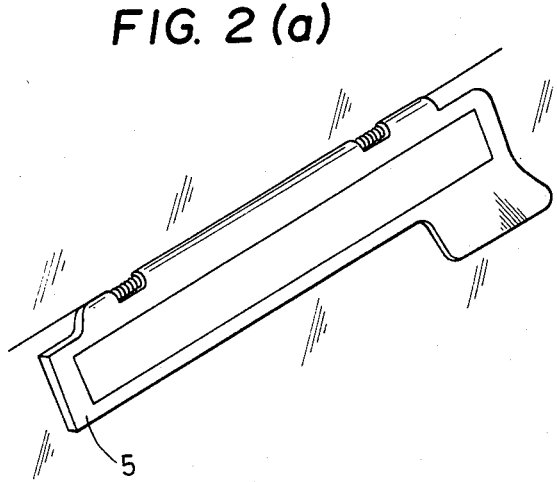
Figure 2B:
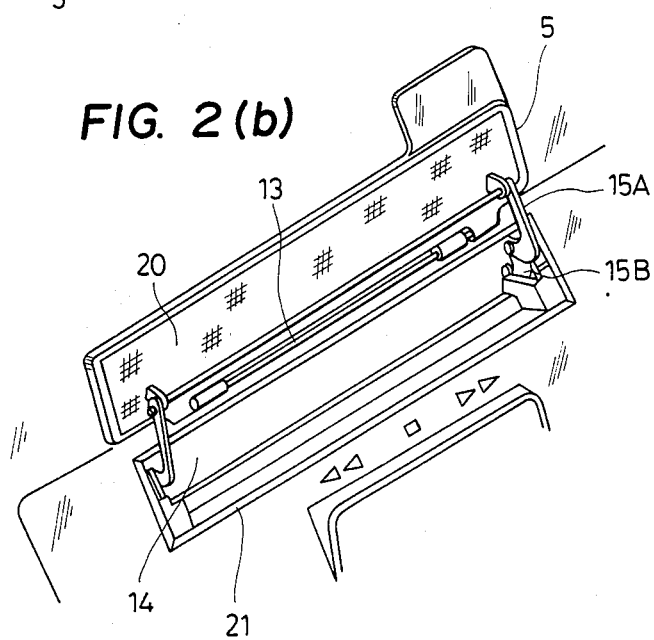

FIGS. 2a and 2b show detail of the cover plate 5 provided at a part of the operation board 2. The cover plate 5 is supported by a rod 13 fixed on the front face of the operation board and is pivotable about the rod 13.

The reference numeral 14 denotes a tape pack insertion aperture formed in the operation board 2 so as to be covered by the cover plate 5. The aperture 14 is completely closed when the cover plate 5 is contact with the front face of the operation board 2 as shown in FIG. 2a while it is opened when the cover plate 5 rotates upward from the operation board 2.

Figure 6A:
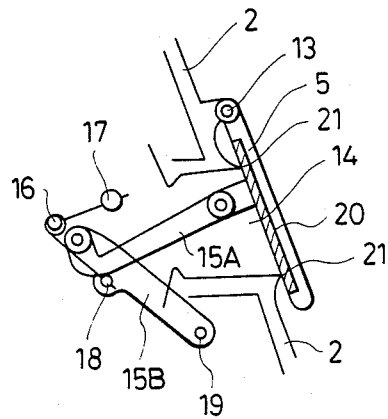
Figure 6B:
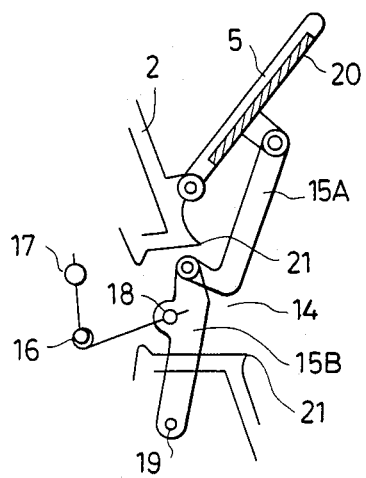

FIGS. 6a and 6b are sectional views corresponding to FIGS. 2a and 2b, respectively, in which the cover plate 5 is opened and closed due to force of a spring 16 which is connected to the cover plate 5 through links 15A and 15B. The spring 16 is supported at the ends thereof by a fixing pin 17 and a movable pin 18 on the link 15B, respectively, and helps the cover plate 5 to completely open and close after it is manually opened and closed halfway. The reference numeral 19 designates another fixing pin about which the link 15B is rotatable with the force from the spring 16.

When the cover plate 5 which is in a closed condition as shown in FIG. 2a is manually rotated up to about half of its full rotational angle (120°–160°), it automatically continues rotation owing to the stress of the spring 16 until it is fully opened. When the cover plate which is in open condition as shown in FIG. 2b is manually closed up to halfway, it automatically rotates downward owing to the stress of the spring 16 until it is completely closed again as shown in FIG. 2a. If an elastic member 20 made of sponge, rubber, etc. is provided at the back of the cover plate 5 and a rib 21 is formed on the operation board 2 for pressure-contact with said elastic member 20, the tape player set 1 can be maintained in good water- or air-tight condition when the cover plate is closed.

Figure 7A:
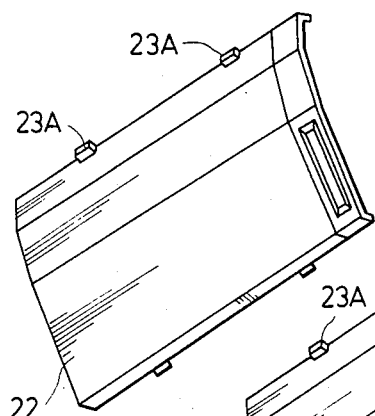
Figure 7B:
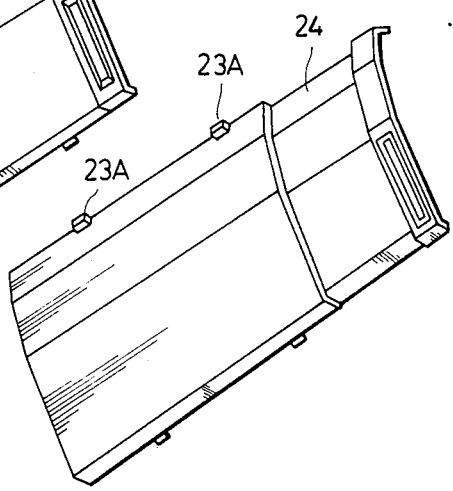

Watertightness can be further improved by covering the operation board 2 with a cover 22 which has protruberances 23A as shown in FIGS. 7a and 7b for engaging with depressions 23B formed in the operation board 2. The cover is preferably made of an elastic material like plastic resin permitting easy assembly and disassembly thereof due to its resiliency. FIG. 7a shows an example of the cover 22 configured to cover a part of the operation board 2 while FIG. 7b shows an example of the cover 22 which has a slide plate 24 to entirely cover the operation board 2.

Figure 8:
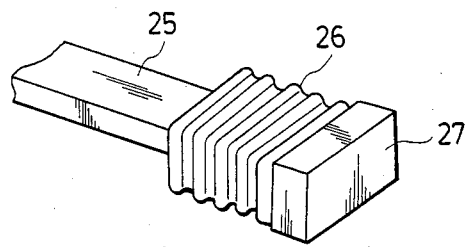
Figure 8:
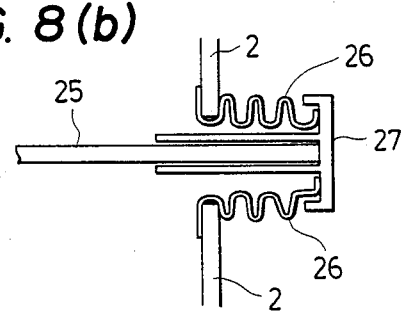
Figure 9:
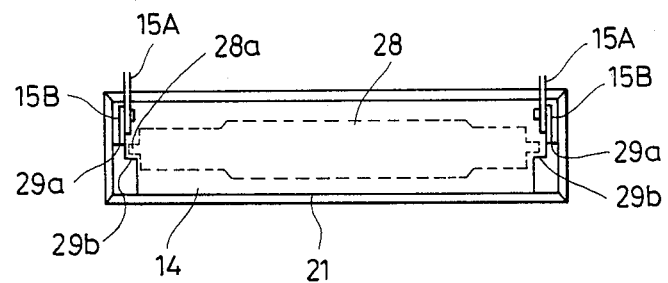

FIGS. 8a and 8b show a further embodiment of the present invention. An operation lever 25, which extends from the tape player set 1 and protrudes through the operation board 25, is covered by a bellows-shaped cover 26 made of rubber, etc.

The reference numeral 27 designates a knob which is mounted at the tip of the operation lever 25. The cover 26 is adhered to the tip surface of the operation lever 25 and the back surface of the knob 27. This improves watertightness of the operation lever 25. At both ends of the tape pack insertion aperture 14 where both ends of a tape pack 28 are to be located, projections 29a and 29b may be formed. The projections 29b smoothly guide projections 28a of the tape pack 28 upon insertion of the tape pack 28 through the aperture 14. Lack of the projections 29b sometimes causes undesirable advancement of the tape pack 28 in inclined state and hence mis-operation of the tape player. The projections 29a may serve as stoppers for the link 15B upon opening the cover plate 5, thus preventing damage of the link 15B caused by carelessly opening the cover plate 5.

The inclination of the operation board 2 makes it easier for a user to operate the tape player as compared with a vertical operation board. More specifically, inclination leads to larger area of the operation board, and this permits easier operation of the tape player particularly during driving. Further, such inclination of the operation board improves the appearance of the tape player, keeping harmony with devices around the tape player.

As apparent from the description in the above, the tape player according to the present invention includes various waterproof means for the operation board which is mounted on the front face of the tape player set. Therefore, waterproofness and dustproofness of the tape player are improved particularly when it is mounted on open-type cars like two-wheeled vehicles. This prevents shortening of the life of the tape player.

I claim:

1. A weatherproof housing for a cassette tape player comprising:
   a casing for acceptingly receiving a tape player therein and having one open side;
   movable cover means for sealingly covering said open side of said casing and operable between a first or covering position sealing the interior of said housing and a second or exposing position exposing at least the cassette insertion aperture of tape player placed in said housing to permit insertion of a cassette into said player; and
   a pair of biased latching means for holding said cover means in either said covering or exposing positions, each said latching means including a first and a second elongated link pivotally joined together at first ends thereof and respectively pivotally joined to said cover means and an interior portion of said housing at second ends thereof, each said latching means including spring biasing means coupled to said second link for urging said second link in either extreme position thereof to hold said cover in either said aperture covering or said aperture exposing position.

2. The housing of claim 1 wherein said housing includes a fixedly securable panel having an elongated aperture therein forming said insertion aperture and disposed to permit direct insertion of said cassette into an operative position in said player, and said cover means includes a movable cover plate pivotally attached to said second ends of said first links and configured to sealingly cover said panel aperture when in the covering position and deployable to an exposing position to expose said panel aperture for cassette insertion, said links being disposed to movably pass through said panel aperture.

3. The housing of claim 2 further including hinge means for rotatably attaching one edge of said cover plate to said panel.

4. The housing of claim 2 wherein said panel is configured for passage of the controls of said player therethrough.

5. The housing of claim 2 which includes an elastic member mounted at the back surface of said cover plate.

6. The housing of claim 5 in which a rib is formed on a part of said panel near said tape pack insertion aperture to contact with said elastic member closely when said cover plate is closed.

7. The housing of claim 4 which includes a bellows-shaped cover for covering an operation lever which protrudes through said panel.

8. The housing of claim 2 which includes a cover member for covering the front face of said panel, said cover member being removably mounted on said panel.

9. The housing of claims 2 or 3 in which tape pack guiding projections are formed at both ends of said tape pack insertion aperture, said guiding projections being configured and disposed to allow said latching means links to move unobstructedly therepast.

* * * * *